(12) United States Patent
Kappelhoff et al.

(10) Patent No.: US 7,983,775 B2
(45) Date of Patent: *Jul. 19, 2011

(54) MATERIAL RESERVATION DISTRIBUTION SYSTEM AND METHOD

(75) Inventors: Ralph L. Kappelhoff, Scottsdale, AZ (US); Paul R. D'Mura, Glendale, AZ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 412 days.

This patent is subject to a terminal disclaimer.

(21) Appl. No.: 12/144,381

(22) Filed: Jun. 23, 2008

(65) Prior Publication Data

US 2008/0255680 A1 Oct. 16, 2008

Related U.S. Application Data

(63) Continuation of application No. 11/537,296, filed on Sep. 29, 2006, now Pat. No. 7,392,104, which is a continuation of application No. 11/299,416, filed on Dec. 12, 2005, now Pat. No. 7,133,732, which is a continuation of application No. 10/669,224, filed on Sep. 24, 2003, now Pat. No. 7,031,782.

(51) Int. Cl.
    *G06F 19/00* (2011.01)
(52) U.S. Cl. ............. 700/95; 700/117; 700/121; 705/22
(58) Field of Classification Search .................... 700/90, 700/95, 117, 121; 705/22, 28; 702/84; 716/19
    See application file for complete search history.

(56) References Cited

U.S. PATENT DOCUMENTS 5,768,119 A  6/1998 Havekost et al.
5,933,347 A  8/1999 Cook et al.
(Continued)

FOREIGN PATENT DOCUMENTS

WO  0159669 A  8/2001

OTHER PUBLICATIONS

Hansoo Kim et al. "Virtual Machines for Message Based, Real-Time and Interactive Simulation", 2000, 4 pages.

(Continued)

*Primary Examiner* — Albert Decady
*Assistant Examiner* — Douglas S Lee
(74) *Attorney, Agent, or Firm* — Turocy & Watson LLP; Alexander R. Kuszewski; John M. Miller

(57) ABSTRACT

The present invention relates to a system and methodology facilitating material-driven processing in an industrial controller environment. Various models supported by database objects are provided to automatically and dynamically map inventory systems/processes to control systems/process such as in batch or recipe operations. A material model is provided that tracks to an inventory database and includes such aspects as defining material types and containers to house such materials. An area model maps the material model to possible units and equipment modules to process the materials. These models include phased-based parameters that define amounts of material that flow into and out of a determined area for processing the materials. Before, during and/or after automated manufacturing operations, object binding operations occur between material-based servers associated with an inventory system and batch servers associated with a process-control system. Such binding includes Just-In-Time or on-demand binding at run time, and relates material requirements of a recipe (or batch) to the units and equipment that are available to produce the recipe.

18 Claims, 13 Drawing Sheets

U.S. PATENT DOCUMENTS

| | | | |
|---|---|---|---|
| 5,960,417 | A | 9/1999 | Pan et al. |
| 6,032,203 | A | 2/2000 | Heidhues |
| 6,701,285 | B2 | 3/2004 | Salonen |
| 6,834,388 | B1 | 12/2004 | Elsbree |
| 2002/0082745 | A1 | 6/2002 | Aust et al. |
| 2003/0004585 | A1 | 1/2003 | Horn et al. |
| 2003/0158795 | A1 | 8/2003 | Hise et al. |
| 2003/0200130 | A1* | 10/2003 | Kall et al. .................... 705/8 |
| 2004/0036698 | A1 | 2/2004 | Thurner et al. |
| 2004/0153187 | A1* | 8/2004 | Knight et al. ............... 700/99 |
| 2004/0181371 | A1* | 9/2004 | Huang et al. ............... 702/188 |

OTHER PUBLICATIONS

S. Manivannan, et al. "Real-time control of a manufacturing cell using knowledge-based simulation", 1991, 10 pages.

M. Burchielli, European Search Report, EP 04 02 2271. Munich, Dec. 6, 2004.

Meguru Hazma, et al. Functions of a Computer Station in a DCS for Batch Process Control. Advances in Instrumentation and Control. Instrument Society of America, Research Triangle Park, US. vol. 45, No. Part 3, pp. 1377-1382, XP000172082. Jan. 1990.

H.A. Elmaraghy, et al. "Feature Based ExpertPparts Assignment in Cellular Manufacturing". Journal of manufacturing systems. Society of Manufacturing Engineers, Dearborn, Mt. US. vol. 8, No. 2, pp. 149-140; pp. 142-145; p. 149. XP000047366. Jan. 1989.

J. Miebs, et al. Flexible Recipe Handling and Batch Control at KNP MAASTRICHT. Engineering and Automation, Siemens Aktiengesellschaft, Berlin, DE. vol. 13, No. 6, pp. 26-29. XP000270307. Nov. 1, 1991.

D.M. Telfer. "Application Integration for CIM". IBM. pp. 385-388. XP010305262. Endicoott, NY. Apr. 16, 1991.

OA dated Mar. 31, 2005 for U.S. Appl. No. 10/669,224, 9 pages.

OA dated Apr. 17, 2006 for U.S. Appl. No. 11/299,416, 10 pages.

OA dated Aug. 3, 2007 for U.S. Appl. No. 11/537,296, 13 pages.

EP OA for European Application Serial No. 04022271.3 dated Mar. 7, 2007, 5 pages.

EP OA for European Application Serial No. 04022271.3 dated Oct. 22, 2008, 4 pages.

EP Search Report for European Application Serial No. 04022271.3 dated Jan. 7, 2005, 4 pages.

* cited by examiner

MATERIAL RESERVATION DISTRIBUTION SYSTEM AND METHOD

CROSS-REFERENCE TO RELATED APPLICATIONS

This application is a continuation of U.S. patent application Ser. No. 11/537,296, filed on Sep. 29, 2006, entitled "MATERIAL RESERVATION DISTRIBUTION SYSTEM AND METHOD" which is a continuation of U.S. patent application Ser. No. 11/299,416, filed on Dec. 12, 2005, entitled, "MATERIAL RESERVATION DISTRIBUTION SYSTEM AND METHOD", now issued as U.S. Pat. No. 7,133,732, which is a continuation of U.S. patent application Ser. No. 10/669,224, filed Sep. 24, 2003, entitled, "MATERIAL RESERVATION DISTRIBUTION SYSTEM AND METHOD", now issued as U.S. Pat. No. 7,031,782. The entireties of the aforementioned applications are incorporated herein by reference.

TECHNICAL FIELD

The present invention relates generally to industrial control systems, and more particularly to a system and methodology to facilitate material-driven processing in an automated industrial controller environment.

BACKGROUND OF THE INVENTION

Industrial controllers are special-purpose computers utilized for controlling industrial processes, manufacturing equipment, and other factory automation, such as data collection or networked systems. In accordance with a control program, the industrial controller, having an associated processor (or processors), measures one or more process variables or inputs reflecting the status of a controlled system, and changes outputs effecting control of such system. The inputs and outputs may be binary, (e.g., on or off), as well as analog inputs and outputs assuming a continuous range of values.

Measured inputs received from such systems and the outputs transmitted by the systems generally pass through one or more input/output (I/O) modules. These I/O modules serve as an electrical interface to the controller and may be located proximate or remote from the controller including remote network interfaces to associated systems. Inputs and outputs may be recorded in an I/O table in processor memory, wherein input values may be asynchronously read from one or more input modules and output values written to the I/O table for subsequent communication to the control system by specialized communications circuitry (e.g., back plane interface, communications module). Output modules may interface directly with one or more control elements, by receiving an output from the I/O table to control a device such as a motor, valve, solenoid, amplifier, and the like.

At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. These variables can be user-defined and can be defined as bits, bytes, words, integers, floating point numbers, timers, counters and/or other data types to name but a few examples.

Industrial controllers are often employed in integrated manufacturing operations that can often involve high-complexity manufacturing processes. Such processes which are sometimes referred to as batch processes are involved in many areas of modern production. These areas include substantially any type of packaged products that are commonly found in grocery stores or other distribution outlets. For example, these products include pharmaceuticals, beauty products, soap, consumer goods, fine chemicals, beverages, candies, sugar, flour, pastries, boxed items such as cereals, frozen products, cheeses, and so forth. Often, complex factory equipment arrangements and programming are provided to produce all or portions of such products. Programming is often provided in terms of Sequential Function Blocks and Charts that relate logical/programmed production operations to equipment assets that control the operations. Thus, conventional programming processes and models are defined in terms of the equipment that produces a given product. This type of programming model, however, can be inflexible, inefficient and costly in terms of asset utilization and in terms of material controls. For example, programmers typically need to create process or logic steps for each material in a recipe. In one example, an ice cream recipe may include steps such as: ADD_CREAM, ADD_EGG, ADD_SUGAR, and ADD_MILK. It becomes even more complicated if there is more than one storage container for each material. For example, if cream is stored in five different containers, a programmer would need five control operations, five equipment allocations, and five recipes simply to get cream from the appropriate container. An operator then has to choose the recipe to run based on where the cream is stored. Thus, many permutations of recipes are required when sugar, eggs and milk are stored in different containers as well. As can be appreciated, if process changes are involved, or if some of the above ingredients need deployed in different processes, then complex manufacturing changes, programming, inventory planning, and material processing need to be re-designed and accounted for. Therefore, equipment-based programming models typically lead to less than efficient asset utilization and generally lead to increased inventory costs.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to facilitate material-based processing in an industrial automation environment. Inventory is dynamically managed by controlling relationships between material inventory reservation requirements and unused equipment capacity. These relationships are controlled within a context or framework that automatically determines and selects equipment to be employed before and/or during a running batch process. As recipes are executed, material requirements and potential equipment for processing the materials are determined. Rather than allocating and distributing materials to and from predetermined containers and vessels, the present invention employs a materials-based mapping to dynamically control and select available assets to perform desired recipe operations. Thus, in one example, as recipe steps are executed, a recipe material may be directed to/from a plurality of available sources that may alternatively supply/receive the recipe material based upon material reservation requirements specified in the recipe. Similarly, materials can be distributed based upon alternative sources of available capacity for receiving material distributions. In this manner, materials can be more efficiently managed from a plurality of dynamically selected options while mitigating waste that may arise from conventional systems that do not support dynamic capacity allocations and material mapping.

In one aspect of the present invention, a material or inventory-model is defined that can be dynamically mapped to a process model in accordance with real time batch or recipe process operations. Since the model and associated mapping is material-based as opposed to conventional equipment-based programming models, respective material resources and equipment utilization can be more suitably allocated to improve automation efficiency and to mitigate material waste. Thus, the mapping facilitates automatically selecting available equipment, containers or portions thereof, and/or materials at run-time based upon attributes of the materials (e.g., material class) as opposed to the equipment that may house or process the materials.

Based upon material attributes, respective equipment can be selected in accordance with asset availability and/or asset capability in a more efficient manner. For example, if a conventional Process A were narrowly defined as being stored by containers 1, 2, and 3, and being made by associated equipment X and Y, then only those respective components could be employed to replicate the process—without reprogramming the process even though other resources may be available for manufacturing Process A (e.g., a portion of a tank or vessel cable of holding or disposing similar materials). In contrast, if Process B were defined in terms of materials, and provided with a material-to-process mapping in accordance with the present invention, then the process can be dynamically implemented in accordance with any available storage/processing containers having desired materials, material processing capabilities, and having access to available or alternative equipment resources. In this manner, materials can be more efficiently stored/allocated by tracking to an inventory model during process operations that includes upstream and/or downstream inventory controls (e.g., material model notifies raw inventory database upstream when process components have been depleted, material model notifies downstream process of an intermediate batch mixture that can be potentially employed in another process).

The material model, which can be a class-based object, supports standards such as S95 or other Enterprise Resources Planning (ERP) models, for example. The model specifies object components such as material states, types, and material classes, wherein the material model maps/associates the object components to containers, lots, and sub lots that house and distribute such materials. An area model can then be defined which provides a potential mapping between logical material requirements specified in the material model and possible vessels/equipment that may be employed to manufacture related/desired batches or recipes from the materials. The area model also includes a phase mapping between requested materials from the material model and components of the area model. The phase mapping includes associated parameters such as how much material to add and/or distribute from a selected process, which materials to employ in the process, and includes defining respective equipment modules for creating an associated batch or recipe. The material model, area model along with associated model state information can then be bound at runtime such as via static, dynamic (e.g., just in time binding), and manual binding procedures. The binding process can further include analysis within an area model to determine which containers and/or equipment modules satisfy a batch or recipe requirement in accordance with various material-driven procedures.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology facilitating material-driven processing in an industrial controller environment. Various models supported by database objects are provided to automatically and dynamically map inventory systems/processes to control systems/process such as in batch or recipe operations. A material model is provided that tracks to an inventory database and includes such aspects as defining material types and containers to house such materials. An area model maps the material model to possible units and equipment modules to process the materials. These models include phased-based parameters that define amounts of materials that flow into and out of a determined area for processing the materials. Before, during and/or after automated manufacturing operations, object binding operations occur between material-based servers associated with an inventory system and batch servers associated with a process-control system. Such binding includes Just-In-Time or on-demand binding at run time, and relates material requirements of a recipe (or batch) to the units and equipment that are available to produce the recipe. In this manner, assets and materials can be more efficiently utilized in accordance with automated material-driven procedures.

It is noted that as used in this application, terms such as "component," "model," "object," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 1:
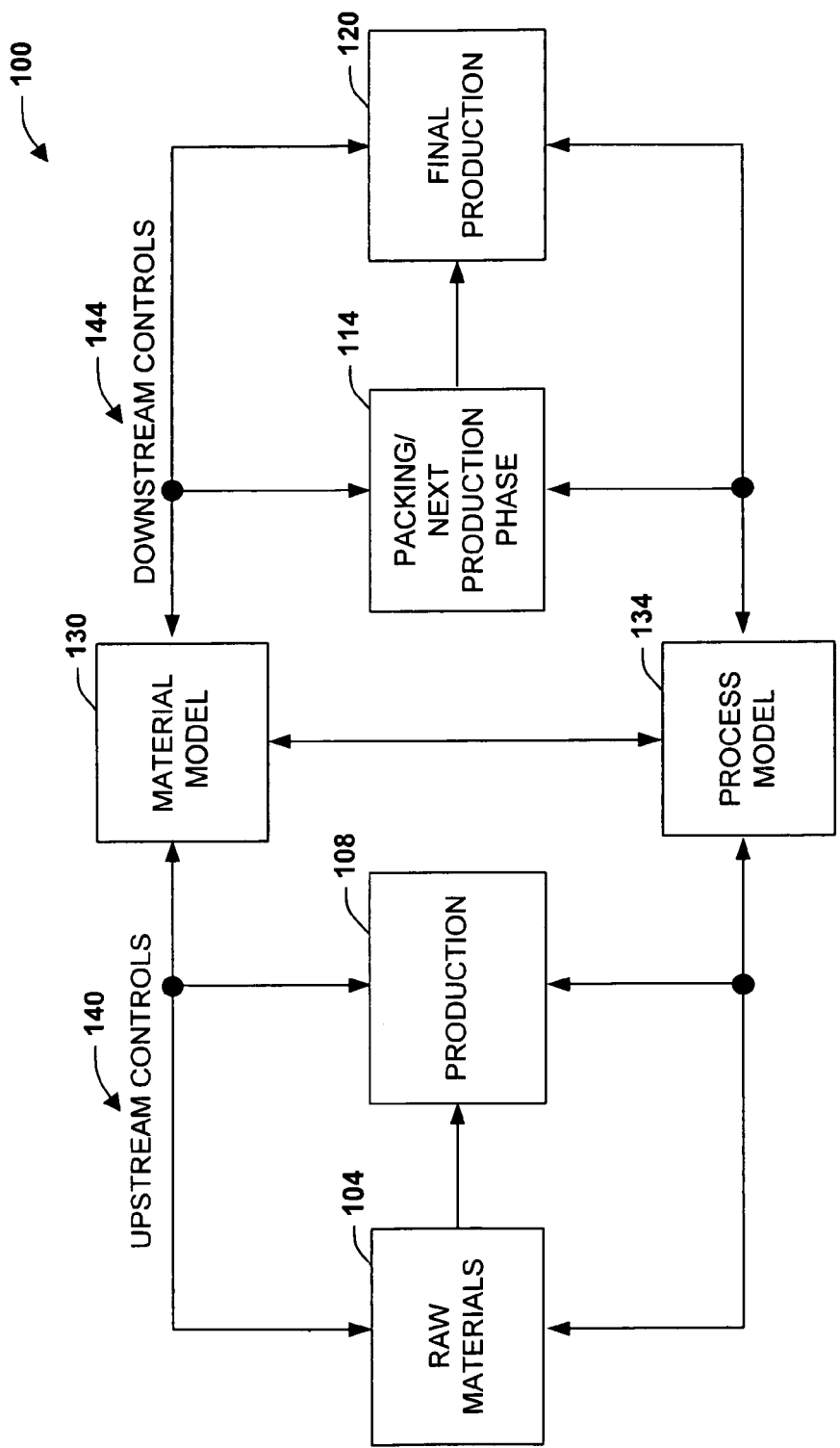
FIG. 1 is a schematic block diagram illustrates a material-based processing system in accordance with an aspect of the present invention.

Referring initially to FIG. 1, a system 100 illustrates material-based processing in an industrial automation environment in accordance with an aspect of the present invention. The system 100 includes various example stages 104-120 in an automated manufacturing process. Raw materials 104 (e.g., various recipe ingredients/components/inventory) feed a production component 108 which can include machines, equipment, controllers, computers, vessels and so forth to process the raw materials such as mixing two or more materials in a container. After material processing, a packing stage 114 commences (e.g., place processed candy into a wrapper, fill and seal containers with beverage such as pop or beer) and later into a final production stage 120, wherein bulk packing and/or packing materials can be added for shipment. It is noted that more or less than four production phases 104-120 depicted in the system 100 can be utilized in accordance with the present invention. In addition, one or more of the stages 104-120 can execute concurrently with other stages.

In one aspect of the present invention, a material model 130 can be dynamically and/or statically mapped/bound to a process model 134 in accordance with real time batch or recipe process operations associated with the stages 104-120. The mapping, which is described in more detail below, facilitates automatically selecting available equipment, containers, and/or materials at run-time based upon attributes of the materials as specified by the material model 130 (e.g., material class, material type, containers). The process model 134 includes programs, batch executables for controlling equipment, function charts and blocks, ladder logic and so forth that control operations of the stages 104-120. Based upon material attributes defined in the material model 130, respective equipment associated with the stages 104-120 can be selected in accordance with asset availability and/or asset capability in a more efficient manner. For example, if a batch or recipe process is defined in terms of materials, and provided with a material-to-process mapping in accordance with the present invention, then the process can be dynamically implemented in accordance with any available storage/processing components having desired materials, material processing capabilities, and having access to available or alternative equipment resources. In this manner, materials can be more efficiently stored/allocated by tracking to the material model 130 during process operations.

As illustrated, the material model 130 provides upstream controls 140 and/or downstream controls 144 that can be employed with the stages 104-120 (e.g., data or control flags indicating status of the material model). For example, the material model 130 can be associated with an Enterprise Resources Planning (ERP) database (not shown) that is automatically updated in accordance with model activities (e.g., model object components changing states in a database during different phases of production). In one example, the material model 130 notifies the raw materials stage 104 upstream when materials have been utilized, depleted, distributed, or having other state changes such as scrapping materials based on automated quality controls. Thus, such notification can cause new materials to be purchased or acquired at 104. In another example, the material model 130 notifies stages 114 and/or 120 of model state changes downstream of current stage conditions at 144 such as providing status that an intermediate batch can be potentially employed in another stage or process, for example, or that one or more control assets have become available for other processing.

The material model 130, which can be a class-based object, supports standards such as S95 or other Enterprise Resources Planning (ERP) models, for example. As will be described in more detail below, the material model 130 specifies components such as material states, types, and material classes, wherein the material model maps/associates the object components to containers, lots, and sub lots that house and distribute such materials. An area model (illustrated below) can be defined which provides a potential mapping between logical material requirements specified in the material model 130 and possible vessels/equipment that may be employed to manufacture related or desired batches from the raw materials 104. The area model also includes a phase mapping between requested materials from the material model 130 and components of the area model. The phase mapping includes parameters such as how much material to add and/or distribute from a selected process and includes defining respective equipment components for creating an associated batch or recipe. The material model 130 and area model along with related model state information can be bound at runtime such as via static, dynamic (e.g., just in time binding), automatic, and/or manual binding procedures.

Figure 2:
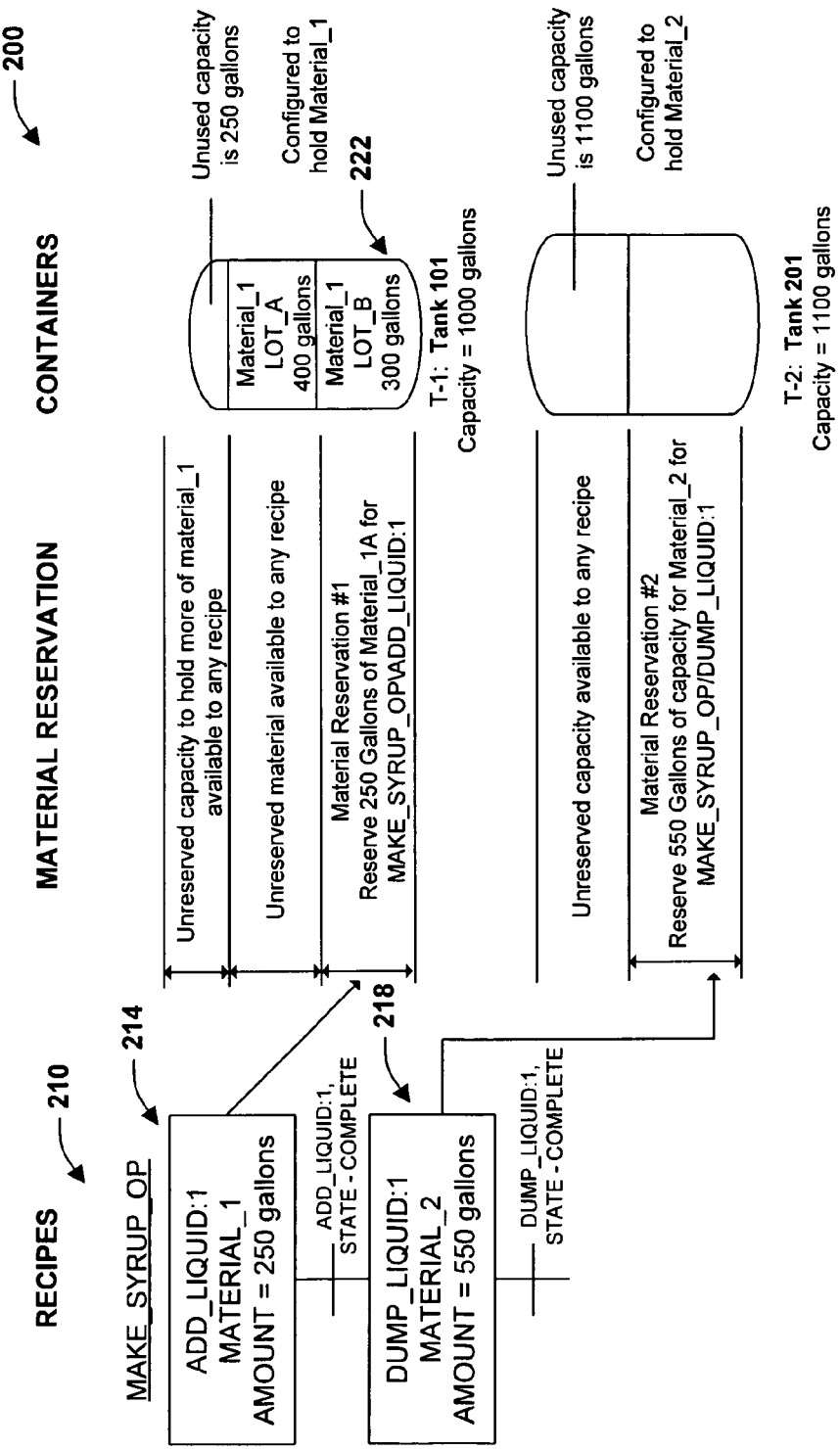
FIGS. 2 and 3 are process diagrams illustrating example material reservations and distributions in accordance with an aspect of the present invention.
Figure 3:
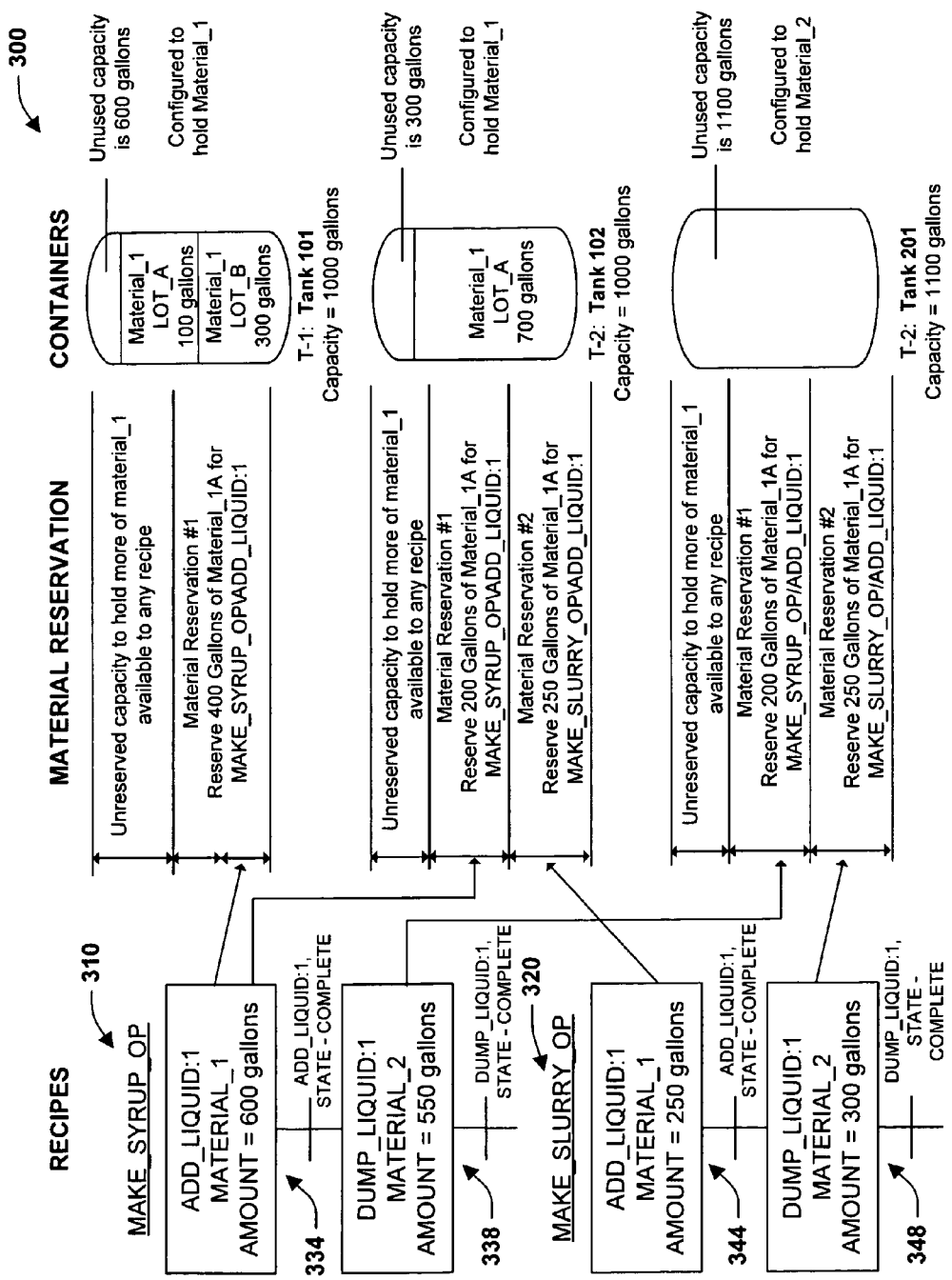

FIGS. 2 and 3 are process diagrams illustrating example material reservations and distributions in accordance with an aspect of the present invention. Before proceeding, it is to be appreciated that the examples given in FIGS. 2 and 3 are provided for illustrative purposes of dynamic material reservations and distributions. Thus, more or less elaborate processing steps having a plurality of various/differing equipment may be employed in variously arranged configurations in accordance with the present invention.

FIG. 2 depicts a system 200 illustrating a basic material reservation and distribution. In this example, two basic material reservations are illustrated. A single Recipe 210, MAKE_SYRUP_OP can be run on a system. It has two steps 214 and 218 with Material Requirements. The first step 214 adds 250 gallons of MATERIAL_1. The second step 218 distributes 550 gallons of MATERIAL_2. Tanks 101 and 201 are plug-flow containers (holding distinct sublots of inventory). The material reserved for the material addition at step 214 (MAKE_SYRUP_OP/ADD_LIQUID:1) is part of a 300 gallons of LOT_B in container TANK_101 illustrated at 222. The material distribution is fairly basic since all the capacity required for this step is located within a single container—TANK_201, and in this case, the container is empty. It is noted that the unreserved material available within TANK_101 is 50 gallons of MATERIAL_1, Lot_B and 400 gallons of Lot_A. Thus, material is dynamically allocated in the respective containers based upon requirements executed in the recipe 210.

In a more complex example of material reservations, FIG. 3 is a system 300 where two recipes 310 and 320 are running concurrently. They may be run on the same Batch Server or two or more different Batch Servers, if desired. The first recipe 310, MAKE_SYRUP_OP has two steps 334 and 338 with Material Requirements. The step 334 ADD_LIQUID:1 will add 600 gallons of MATERIAL_1 to a batch. In this example, there is not enough material in Tank 101 to meet the material requirement, so the material reservation for the recipe step spans both Tank 101 and Tank 102. The second step 338, DUMP_LIQUID_1 distributes 550 gallons of MATERIAL_2 to a holding tank. TANK_201 is currently empty, thus 300 gallons of capacity is reserved for use exclusively by this recipe step.

The second recipe 320, MAKE_SLURRY_OP also has two steps 344 and 348 with Material Requirements. The step 344 ADD_LIQUID:1 adds 250 gallons of MATERIAL_1 to the batch. Although at the time of binding the recipe to equipment, there was 400 gallons of MATERIAL_1 in TANK_101, in this example, it is all reserved for use by another recipe. Thus, this recipe 320 now draws the material from another tank, TANK_102. Note that TANK_102 is now hosting two reservations from two different recipes 310 and 320. Therefore, as illustrated, it is possible that a single recipe can have multiple, distinct reservations against one or virtually any number of available containers. Moreover, it is the management of the relationships of the reservation of material inventory and unused capacity within the context of determining the equipment to be used by a running batch process that provides many benefits over conventional systems such as promoting efficiency, maximizing resource utilization and mitigating inventory waste.

It is noted that other components and processes can be provided to support material reservation and distribution in accordance with the present invention. These may include allowing operators to interact with reservations when the quantity of material or capacity varies (e.g., measuring large quantities of inventory typically involves measuring errors) in order that the reservation can be suitably accounted for by the needs of the recipe step. Also, the reservations should be defined when the unit the operation recipe will run in is selected. Changing the unit a recipe is bound to may subsequently cause changes in material reservations.

Figure 4:
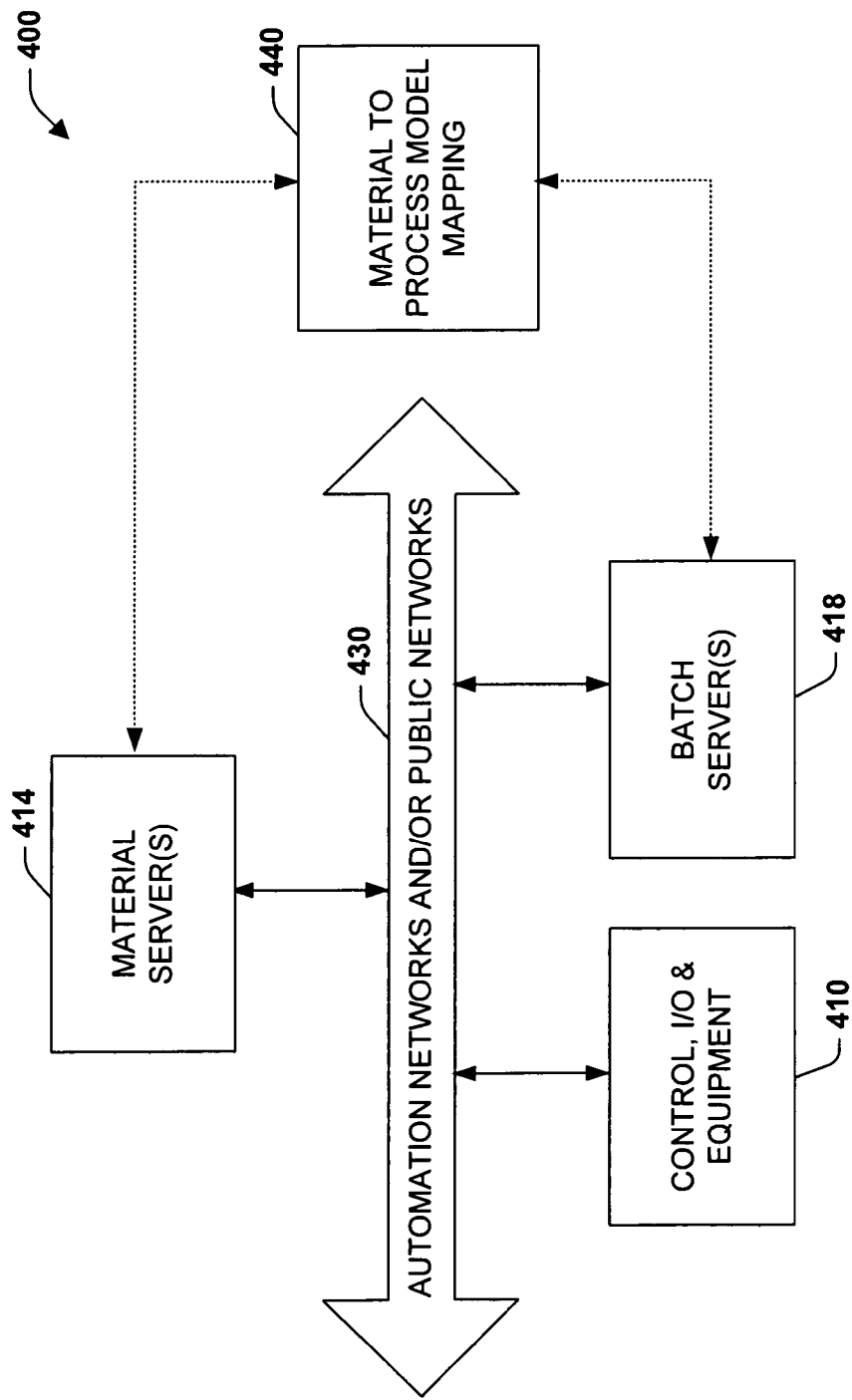
FIG. 4 is a schematic block diagram illustrating a model processing system in accordance with an aspect of the present invention.

Referring now to FIG. 4, a model processing system 400 is illustrated in accordance with an aspect of the present invention. Various control, I/O, and equipment 410 (also referred to as automation components 410) communicate and cooperate with one or more material servers 414 and one or more batch servers 418 across a network 430. The automation components 410 include substantially any type of control, communications module, computer, I/O device, Human Machine Interface (HMI)) that communicate via the network 430 which includes control, automation, and/or public networks. In one example, the automation components 410 include Programmable Logic Controllers (PLC) that can also communicate to and control various other components such as Input/Output modules including Analog, Digital, Programmed/Intelligent I/O modules, other programmable controllers, network communications modules, and the like.

The network 430 includes access to public networks such as the Internet, Intranets, and automation networks such as Control and Information Protocol (CIP) networks including DeviceNet and ControlNet (can be adapted as multiple networks wherein factory networks are isolated from public networks). Other networks 430 include Ethernet, TCP/IP, DH/DH+, Remote I/O, Fieldbus, Modbus, Profibus, wireless networks, serial protocols, and so forth. In addition, the automation components 410 can include network components such as switches with virtual local area network (VLAN) capability, LANs, WANs, proxies, gateways, routers, firewalls, virtual private network (VPN) devices, other servers and/or clients, configuration tools, monitoring tools, and/or other devices.

According to one aspect of the present invention, the material server 414 executes a recipe or material driven process(es) in accordance with the batch server 418, wherein the batch server runs automated routines such as control algorithms, batch procedures, and/or functions that operate in conjunction with the material models, area models, and/or recipes stored in the material server 414. Respective system processes and operations are executed according to a material-to-process model mapping at 440 that coordinates requirements of a recipe as specified by the material model and automated processes performed by the batch server 418.

The material server 414 provides plant-level material management and tracking that can be tied to corporate material management systems. In one aspect, the material server 414 manages and tracks material utilization by material type, lot, and sublot. This can include managing and tracking vessels, containers and pallets, for example, as well as permanent and transient storage capabilities. The material server 414 via the models described herein can also provide automatic support for bulk containers associated with multiple lots which can be represented as composites and/or plug flow separated containers.

Models or objects stored in the material server 414 include material definitions for recipes, thus significantly reducing the number of recipes needed for flexible storage facilities. Material consumption, production, and association of materials to containers and vessels can be automatically logged, providing useful information for forward and backward material tracking (e.g., in accordance with upstream and downstream communications) within and across process cells. Material recipes, also referred to as material-based recipes, enable users to define recipes in terms of materials employed, not merely by plant equipment. A material-based recipe can also employ material-enabled phases, which are configured and stored in an area model described below. Material-enabled phases support the specification of a material as a mapping to locate equipment, and then bind to that equipment according to a control recipe.

As will be described in more detail below, the material server 414 can be associated with other components that work together to service various applications. These applications can include inventory tracking capabilities, user interfaces such as material editors, recipe editors, equipment editors, Active X controls, and so forth which are employed to configure the various models described herein. It is noted that the present invention supports various object models and associated interfaces for communicating between components in the system 400 (e.g., Component Object Model (COM), Distributed COM (DCOM), CORBA, .NET interfaces and so forth). This can including exposing object interfaces to third party developers to facilitate custom operations in the system 400 (e.g., expose IDL interfaces to a Material Model or object).

Furthermore, the material server 414 and/or batch server 418 can include database access and/or storage capabilities for access and control of models and processes described herein (e.g., Structured Query Language (SQL) database/server, XML data storage, SQLXML databases, and so forth).

Figure 5:
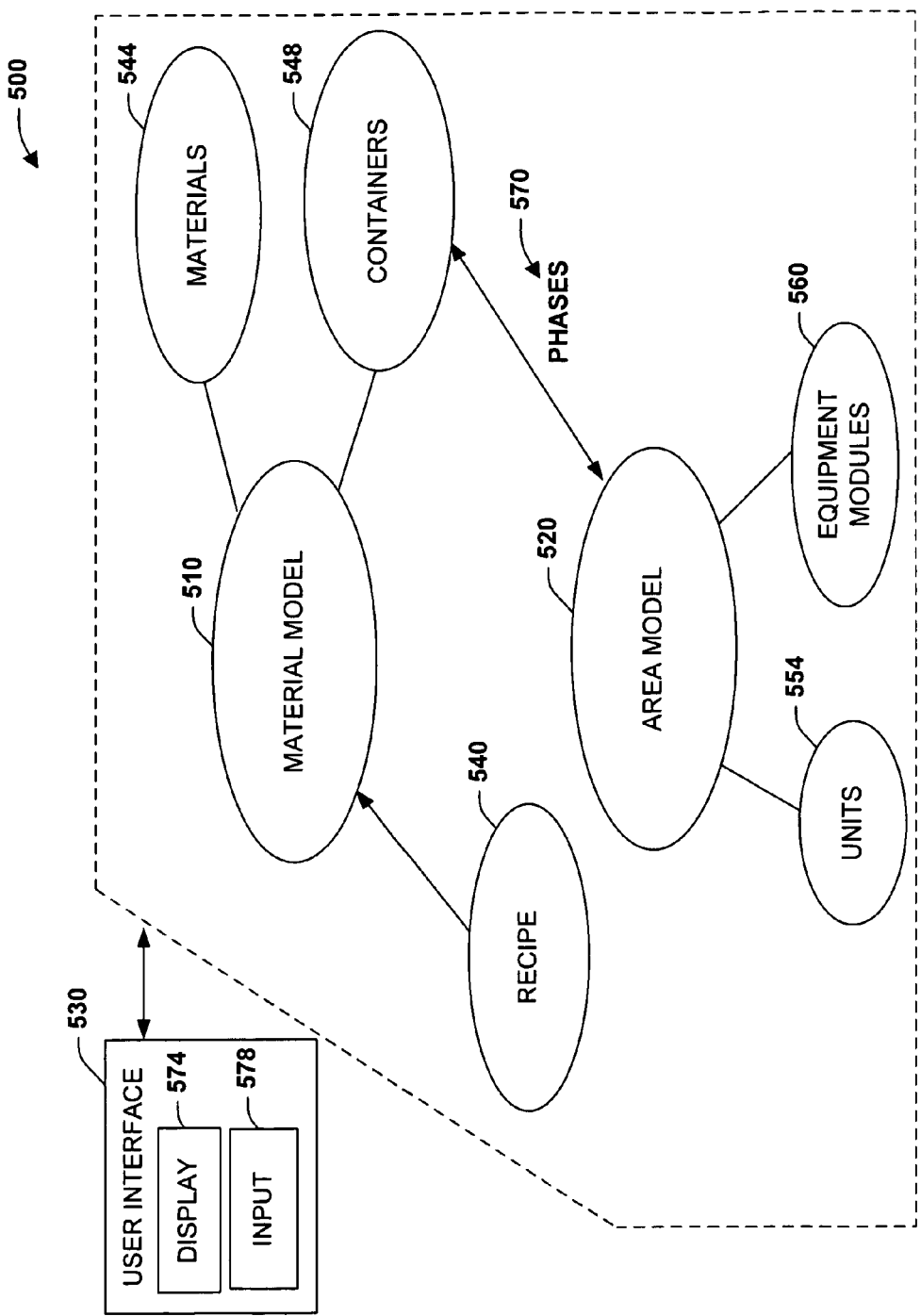
FIG. 5 is a diagram illustrating model mapping in accordance with an aspect of the present invention.

Turning to FIG. 5, a system 500 illustrates model mapping in accordance with an aspect of the present invention. The system 500 includes a material model 510, an area model 520, and user interface 530 for configuring the models. In general, the material model 510 specifies one or more components of a recipe 540. These components include materials 544, containers 548 that house the materials and other components that are described in more detail with respect to FIG. 4. The materials 544 include object/class-based elements and states that describe recipe materials, whereas the containers 548 are modeled as repositories for the materials. The area model 520 defines one or more units 554 that describe manufacturing sites for producing the recipes 540 and prospective equipment modules 560 that can be employed to control manufacturing processes within the units 554. In addition, the area model 520 can specify one or more phase parameters 570 that associate the containers 548 to the area model. In general, the area model 520 defines an equipment association between a container that holds inventory and an equipment module that has a physical association with the container. Thus, invocation of the recipe 540 drives production of an automated manufacturing process in terms of the materials 544 specified in the material model 510 that facilitates efficient/flexible equipment utilization and material management in accordance with the present invention.

The user interface 530 is provided to serve various applications to configure and manipulate the material model 510, the area model 520, databases and/or servers described above. For example, the user interface 530 can include a material editor for manipulating the material model 510, an equipment editor for editing the area model 520 such as specifying the equipment modules 560, and/or a recipe editor for manipulating the recipe 540 (or recipes). For example, a material editor provides a user interface 530 to facilitate creating a material database, which includes materials, lots, sublots, containers 548, and/or storage location data which are described below. As noted above, a material server provides communications between the material database and a batch server. During a batch run, information about available containers is automatically determined, or presented to an operator for binding decisions. After a batch is run, quantities consumed or distributed are updated in the material database for inventory tracking.

The user interface 530 includes various data manipulation and output capabilities.

To implement material-based recipes, several types of data are typically configured such as:

Material Data

To add materials, lots, sublots, and the containers that hold them. This data is typically stored in a material database;

Equipment Data

An equipment editor can be employed to create material-enabled phases and then associate the resultant equipment module 560 with a container 548;

Recipe Data

A recipe editor can be utilized to define the materials and amounts to employ in a recipe 540.

As can be appreciated, the user interface 530 can include various display and input capabilities. Thus, the user interface can be provided as a Graphical User Interface (GUI) or interface application to interact with the system 500. This can include substantially any type of application that sends, retrieves, processes, and/or manipulates the various models, data, and processes described herein. For example, such user interfaces 530 can also be associated with an engine or web browser although other type applications can be utilized. The user interface 530 includes a display 574 having one or more display objects (not shown) including such aspects as configurable icons, buttons, sliders, input boxes, selection options, menus, tabs and so forth having multiple configurable dimensions, shapes, colors, text, data and sounds to facilitate operations with the systems and processes described herein. In addition, the user interface 530 can also include a plurality of other inputs 578 or controls for adjusting and configuring one or more aspects of the present invention. This can include receiving user commands from a mouse, keyboard, speech input, web site, remote web service and/or other device such as a camera or video input to affect or modify operations of the user interface 530.

Figure 6:
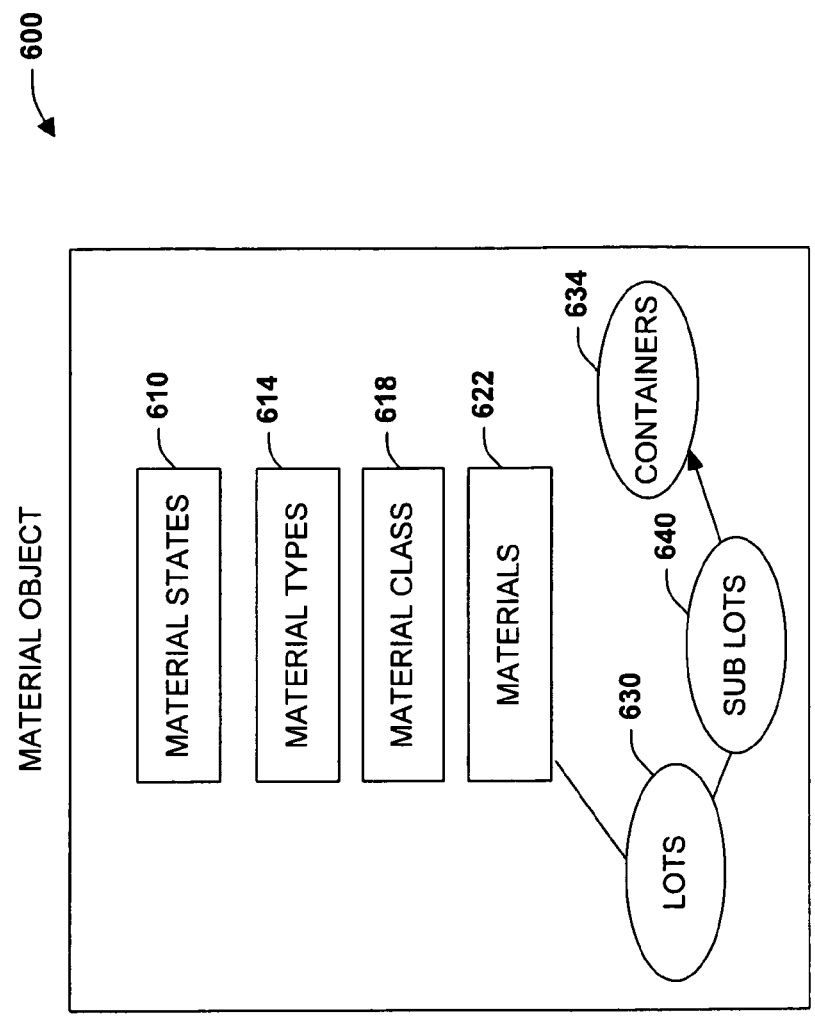
FIG. 6 is a diagram illustrating a material object in accordance with an aspect of the present invention.

Referring now to FIG. 6, a material object 600 is illustrated in accordance with an aspect of the present invention. In general, a material is a logical representation of a recipe ingredient, such as cream or sugar. For respective materials, lots are created, which are physical instances of a material. For example, when a new shipment of cream arrives at a factory, a new lot can be added to identify that shipment of cream. When distributing a lot to containers, the distributed portions become sublots, which are the physical inventory that is stored in a container. For example, a lot of cream may be divided into sublots that are stored in separate containers.

The material object 600 illustrates various aspects of the material model described above. In one aspect, material states are identified at 610 (e.g., in use, on hold, ready to use, rejected, currently in service, under review by QA, unacceptable for use, and so forth). To be used in a batch, a container and the materials within a container should be in a Ready to Use state. At 614, one or more material types are defined for informational and organization purposes and generally do not affect the building or execution of material-based recipes (e.g., types such as finished, intermediate, raw, and so forth). At 618, a material class defines a group of materials that are similar. For example, a material class called Sweetener could contain materials such as Granulated Sugar, Brown Sugar, and Corn Syrup. Material classes 618 can be employed to simplify the assignment of materials to storage containers. When a storage location is defined, the material(s) that can be stored in the container are indicated. Thus, with material classes 618, the members of a class of materials can be assigned to a container, as an alternative to assigning the materials individually. At 622, one or more materials are defined that provide ingredients for a recipe. For defined materials at 622, one or more lots can be specified at 630, which are object instances of a material. When distributing the lots 630 to one or more containers at 634, distributed portions of the lots become sublots 640, wherein the sublot is physical inventory that is stored in the container 634.

As noted above, the containers 634 are repositories for inventory. When a batch is executed, a Batch Server queries a Material Server to locate containers 634 that meet the material requirements of a process step or function. That container 634 is then selected for binding to the batch which is described in more detail below. The material object 600 can support many different types of containers 634 such as:

Composite Containers typically hold one material and lot at a time. As new sublots are created and linked to a composite container, the sublots are combined within the container. As each sublot is added to the container, they blend together making it implausible to distinguish between the sublots. During binding, the entire content of the container is typically considered.

Plug-Flow Containers typically hold one material, but can hold multiple sublots. Each sublot remains distinct and so have different lot and/or label names than other sublots in the plug-flow container. Sublots that are added to a plug-flow container are available for use in a first-in/first-out fashion. The first sublot placed in the container is the first sublot used, then the second sublot is used, and so forth. During binding, the first-out sublot is typically considered.

Pallet Containers hold many different materials and many sublots of each material. Each sublot can optionally have a label regardless of the container it is in. Other sublot properties are inherited from the lot properties. During binding, each sublot on the pallet is considered.

Figure 7:
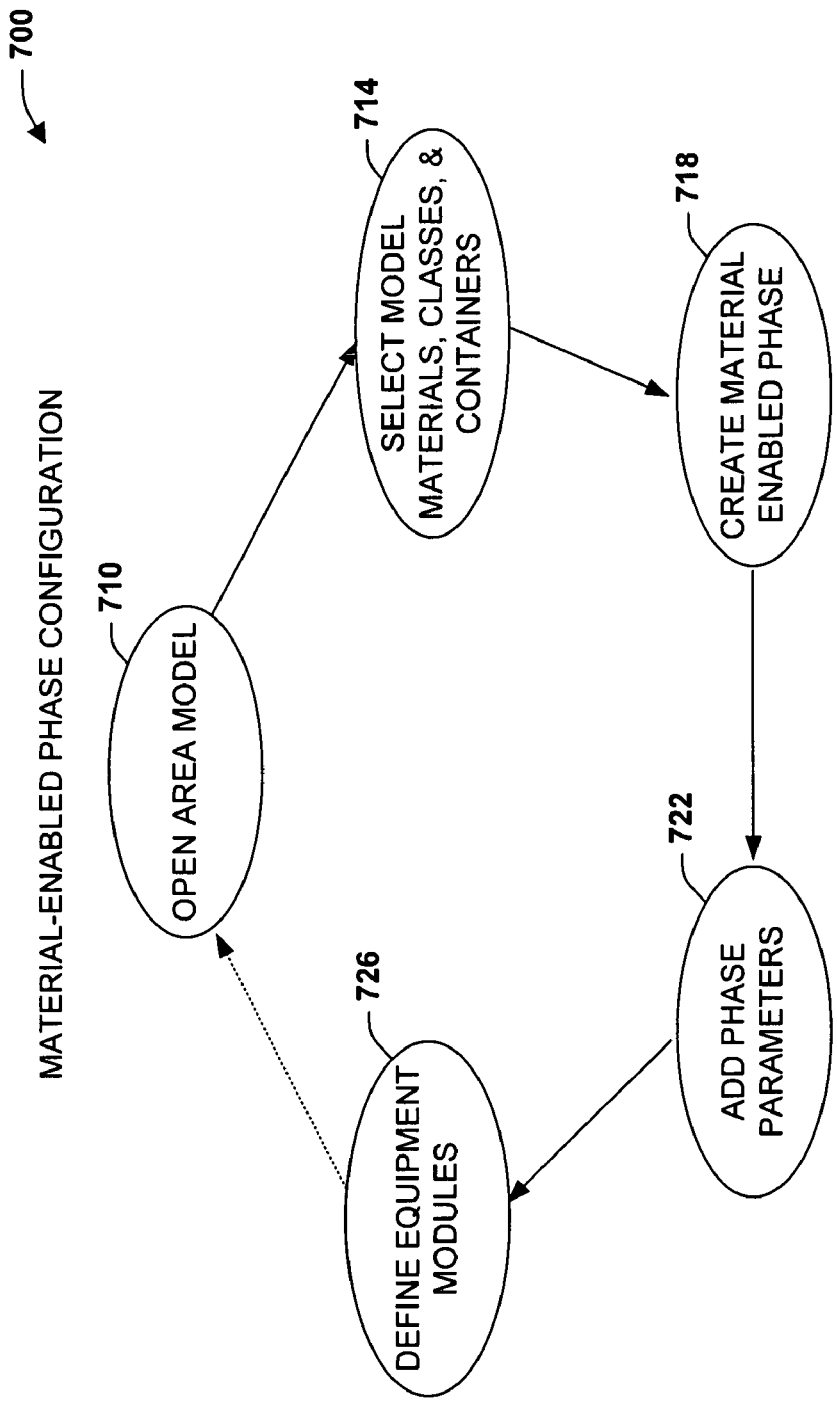
FIG. 7 is a diagram illustrating a material-phase in accordance with an aspect of the present invention.

Turning now to FIG. 7, a material-enabled phase process 700 is illustrated in accordance with an aspect of the present invention. Proceeding to 710, an area model is opened, wherein one or more process cells are defined (e.g., West Cell, North Parlor, Cell 1, Cell 2 and so forth). At 714, various materials, material classes, and containers that house the materials or classes are selected for the area model and are to be employed in a given recipe. At 718, one or more material enabled phases are created. Material-enabled phases are associated with the ingredients of a recipe and describe material additions and/or distributions from a process cell. At 722, phase parameters are selected. For example, this can include a MATERIAL parameter defines the minimum material specification required to query a material database for containers to consider as binding candidates for a material-enabled phase. An AMOUNT parameter can be specified that can be employed as a set point, or target, for the quantity of MATERIAL for an associated equipment module. Material additions are typically expressed as zero or a positive value, whereas material distributions are typically expressed as zero or a negative value. The high/low range of valid values should reflect the possible use of the phase. If the phase is to handle a material addition and distribution, this range should span positive and negative values. At one or more equipment modules are defined or selected that are employed in manufacturing or controlling the area model (e.g., associate Container A with Equipment Module 1 and Equipment Module 2 that drive sequential charts and automation components to add and/or distribute materials to Container A).

Figure 8:
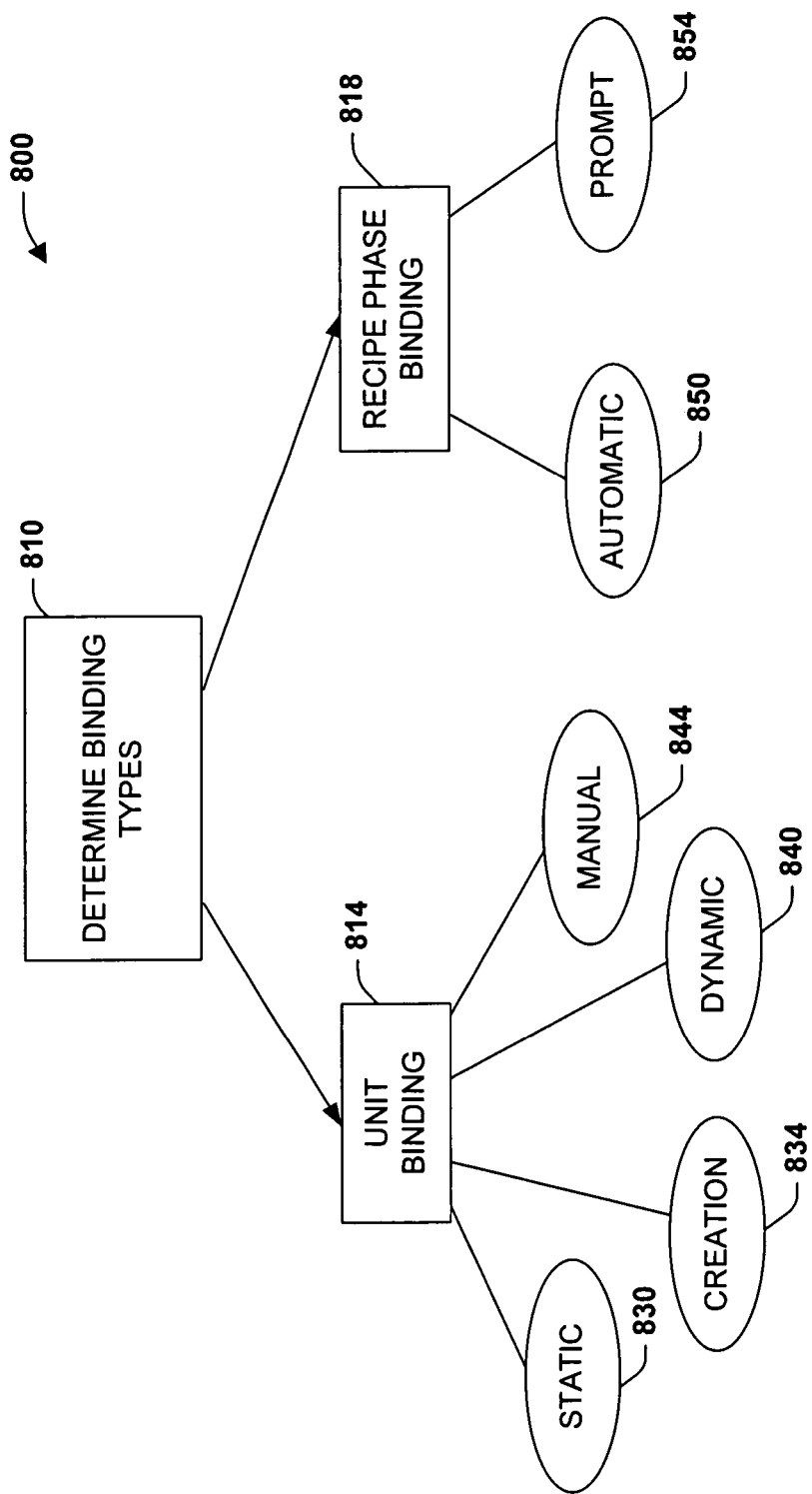
FIG. 8 is a diagram illustrating binding operations in accordance with an aspect of the present invention.

FIG. 8 illustrates a binding process 800 in accordance with an aspect of the present invention. Before running a material-based recipe, the binding process 800 is employed to locate equipment and materials associated with a batch. When a material-based recipe is placed on a batch server list, the Batch Server makes a request to a Material Server for containers that can support the material requirement. The Material Server then returns a list of binding candidates based upon:

Material requirements of a recipe (a unit should satisfy the recipe's material requirements);

Area model configuration (units and equipment modules should be available); and

Container and lot states (should be in the Ready To Use state).

At 810, binding types are determined, whereby Batch and Material Servers generally follow one or more of the following processes to bind a material-based recipe automatically or to prepare a list of binding candidates from which an operator can select:

At 814, a Unit Binding may be employed. The type of unit binding selected affects how units are selected for binding. Thus, the Batch Server analyzes the material requirements presented by the Material Server to select a unit that can satisfy the requirements. The material requirement is based upon the material, the feed type (addition or distribution) and, optionally, the lot and label.

At 818, Recipe Phase Binding may be employed. When a unit is selected, the Batch Server further analyzes the status of the containers and equipment modules available within the unit to determine which containers and equipment modules can supply the material to satisfy the recipe's material requirements.

The type of unit binding selected at 814 can affect which units are selected for running a recipe. There are typically four types of unit binding: Static at 830, Creation at 834, Dynamic Unit Allocation at 840, and Manual at 844. Static binding 830 is a predetermined user specification that causes a recipe to bind to the predetermined specification (e.g., bind to unit 1). Creation binding 834 enables a class of units from which a unit may be selected for binding. Creation binding allows the operator to specify the unit(s) a class-based recipe is to be run in when the batch is put on the batch list. For material-based recipes, this implies that the set of units to select from should not only be of the correct unit class (equipment class) but should also be capable of meeting the material requirements of the recipe to be run at the time of creating the batch (i.e., now). For example, in a process cell where there are two units. Selecting MBR_UNIT_CLASS enables a Batch Server or an operator to select from UNIT1 or UNIT2.

Dynamic unit allocation at 840 (also referred to as Late Binding) provides more options for unit binding. An alias can be assigned to all unit instances of a designated unit class. When a recipe is put on a Batch List and the server encounters the alias name, it looks up the unit classes or instances that are mapped to the alias name. A binding type should also be assigned that applies to each unit instance assigned to the alias. The binding types include:

First Available

While the batch is running, the Batch Server allocates the first available legal unit to the recipe. Binding occurs when the first unit procedure mapped to the alias is ready to run. For material phases, if there are multiple equipment modules associated with a container, the first available equipment module is selected. If multiple equipment modules are available, the one with a lowest controller ID can be selected.

Prompt

While the batch is running, an operator is prompted to bind to a specific unit when the first unit procedure mapped to the alias is ready to run.

At Batch Creation

When the batch is created the operator binds the recipe to a specific unit.

Operator Choice

When the batch is created, the operator can choose to bind the recipe to a specific unit or choose the Prompt or First Available binding process.

Manual binding at 844 is a process of binding a unit or rebinding a previously bound unit to a step Procedure such as a Sequential Function Chart (SFC) or Table window in a Batch user interface while a batch is running.

After a unit is selected for binding, a Batch Server may search for more material specifications to select which container and equipment module to employ for binding. This level of binding is referred to as the Recipe Phase Binding at 818, wherein designated containers can be linked to more than one equipment module. The recipe phase binding process 818 involves identifying a container that can supply or receive the material identified in the recipe, and then selecting an equipment module that is linked to the container and satisfies the recipe. Material Phases can bind to an equipment module/container pair automatically or an operator can be prompted to make a selection.

A container binding can be configured on each material-enabled phase of a recipe. There are typically two types of container binding, Automatic container binding at 850 and Prompt container binding at 854. If Prompt container binding is selected at 854, an operator is prompted just before the phase runs to select from a list of containers that meet the material requirement.

If Automatic container binding is selected at 850, the Batch Server selects the container based on several criteria before the phase runs. If Automatic container binding 850 is selected, a container feed type adds to the criteria utilized to select containers for binding (e.g., Addition and/or Distribution). It is possible to have a container/equipment module pair configured for both addition and distribution. When Automatic container binding is selected at 850, the Batch Server selects the container/equipment module based on the recipe's material requirement. If there is more than one container that meets the material requirement, binding is based first on the container priority, second on the amount of material for additions or the available space in the container for distributions, and third on the container controller ID.

Figure 9:
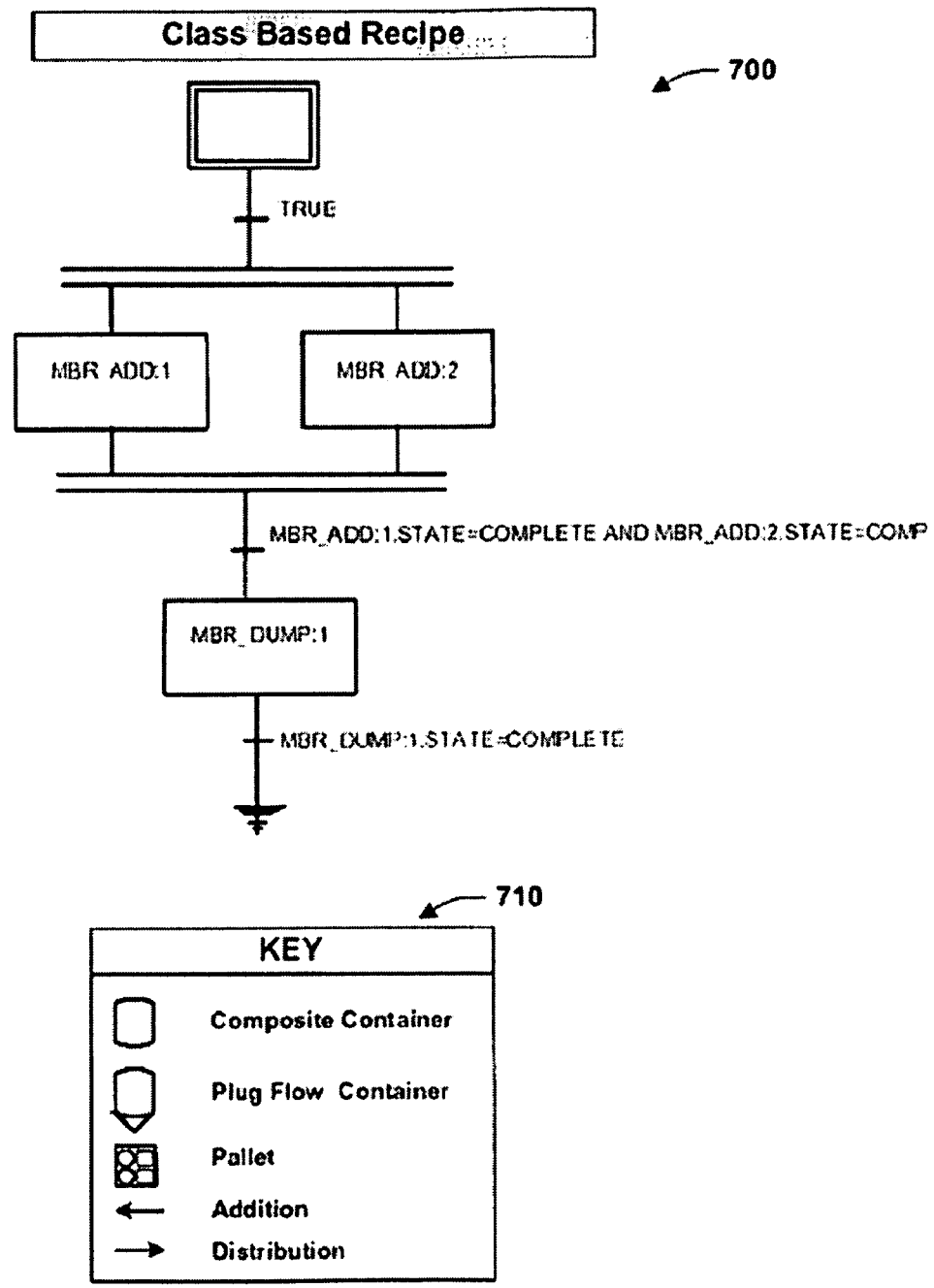
FIG. 9 is a diagram illustrating a material-based process chart in accordance with an aspect of the present invention.

FIGS. 9-12 illustrate an example system and process that illustrate various aspects of the present invention. It is to be appreciated however, that more or less than the illustrated components, materials, and steps can be provided in addition to various other combinations than so illustrated. FIG. 9 illustrates a material-based process chart 900 that includes example material based add steps MBR_ADD:1 and MBR_ADD:2, and a distribution step MBR_DUMP:1. The following examples in FIGS. 8-10, employ a class-based recipe and area model to illustrate different factors in accordance with example configurations associated with the material-based steps depicted in FIG. 9. A key 910 illustrates various components in FIGS. 10-12 such as composite containers, plug flow containers, and pallets, wherein direction arrows indicate additions and/or distributions to/from a respective container.

Figure 10:
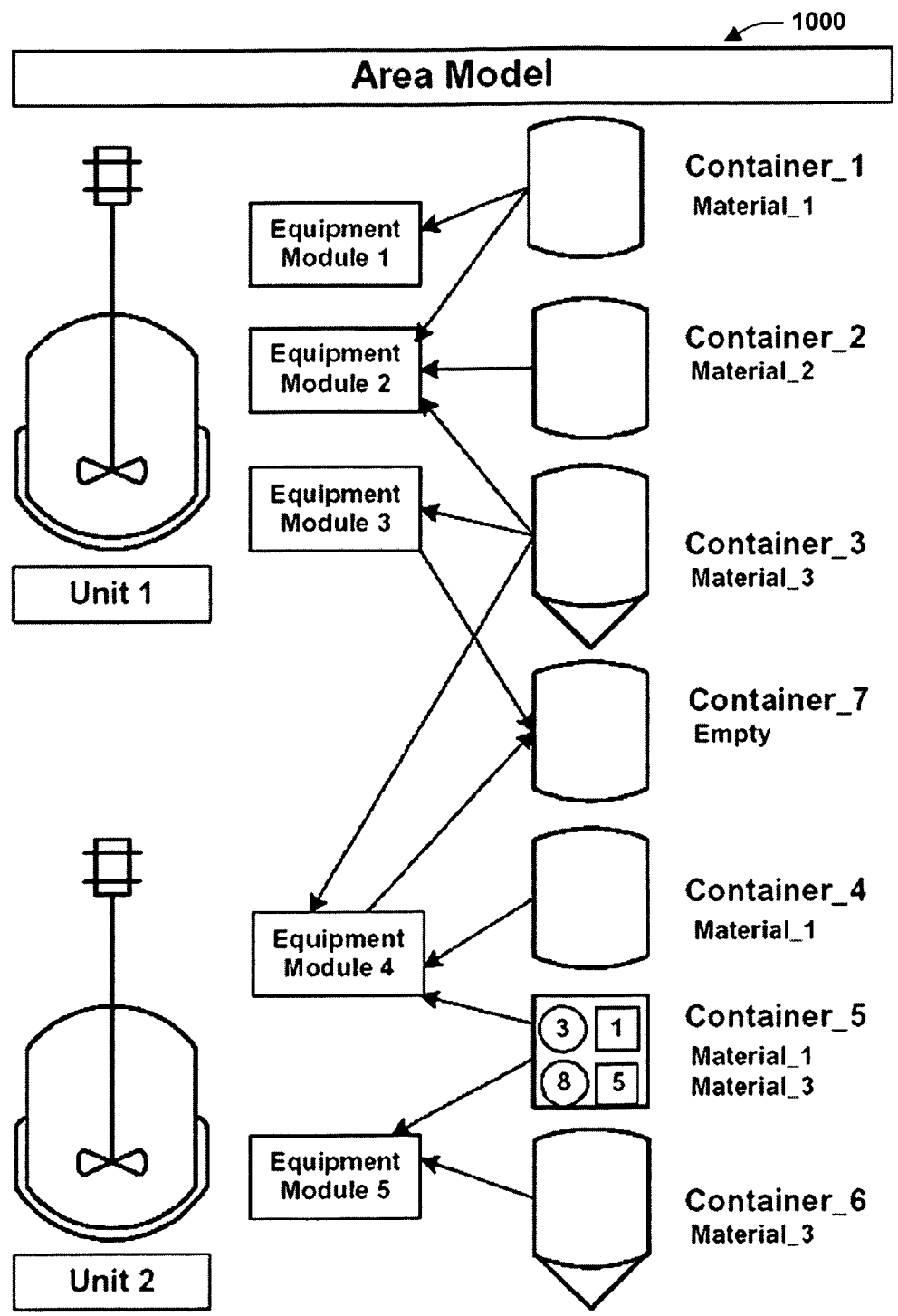
FIGS. 10-12 illustrate area models and components in accordance with an aspect of the present invention.

FIG. 10 depicts an area model 1000 having respective units, equipment modules, containers, materials, and having the following illustrative parameters:

Material Requirement: Material

The unit selected to run the recipe can vary depending on the material requirement.

Example

MBR_ADD:1 requires an addition of Material_1.
MBR_ADD:2 requires an addition of Material_2.
Since Unit_2 does not have the ability to make an addition of Material_2, in this example, Unit_1 is selected to bind to the batch.

Figure 11:
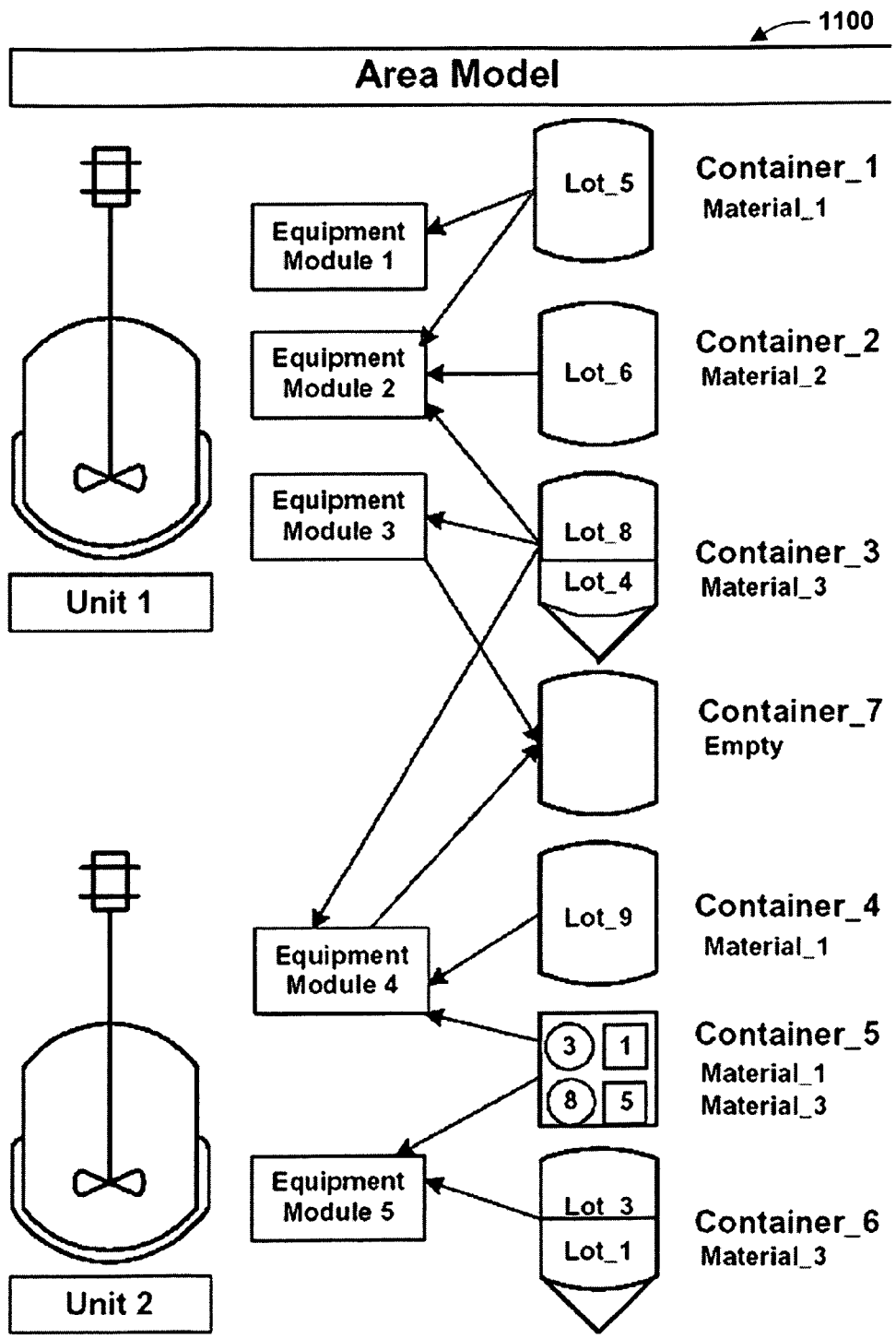

FIG. 11 depicts an area model 1100 having respective units, equipment modules, containers, materials, and having the following illustrative parameters:

Material Requirement: Material and Lot

The use of lots in the material requirement further narrows down the unit and equipment modules selected for binding.

Example

MBR_ADD:1 requires an addition of Material_1, Lot_5.
MBR_ADD:2 requires an addition of Material_3, Lot_4.
In this example, Unit 1 is selected since it can draw from the specified lots. Unit_2 can satisfy the materials but not the specified lots.

In another example from the model 1100, a container type can limit the unit and equipment modules selected for binding. Plug-flow containers can hold multiple lots of the same material but lots should be used in the order they were added to the container (first-in/first-out order). Pallet containers also can hold multiple lots of the same material but the order they were added to the container is not generally considered.

Example

MBR_ADD:1 requires an addition of Material_1.
MBR_ADD:2 requires an addition of Material_3, Lot_3.
The recipe binds to Unit_2 because it's the only unit capable of drawing Lot 3. Container_6 is not selected because it is a plug-flow container and Lot_1 should be depleted before Lot_3 can be utilized. Container_5 is selected because it is a pallet container and lots are available regardless of the order they were added to the pallet.

Figure 12:
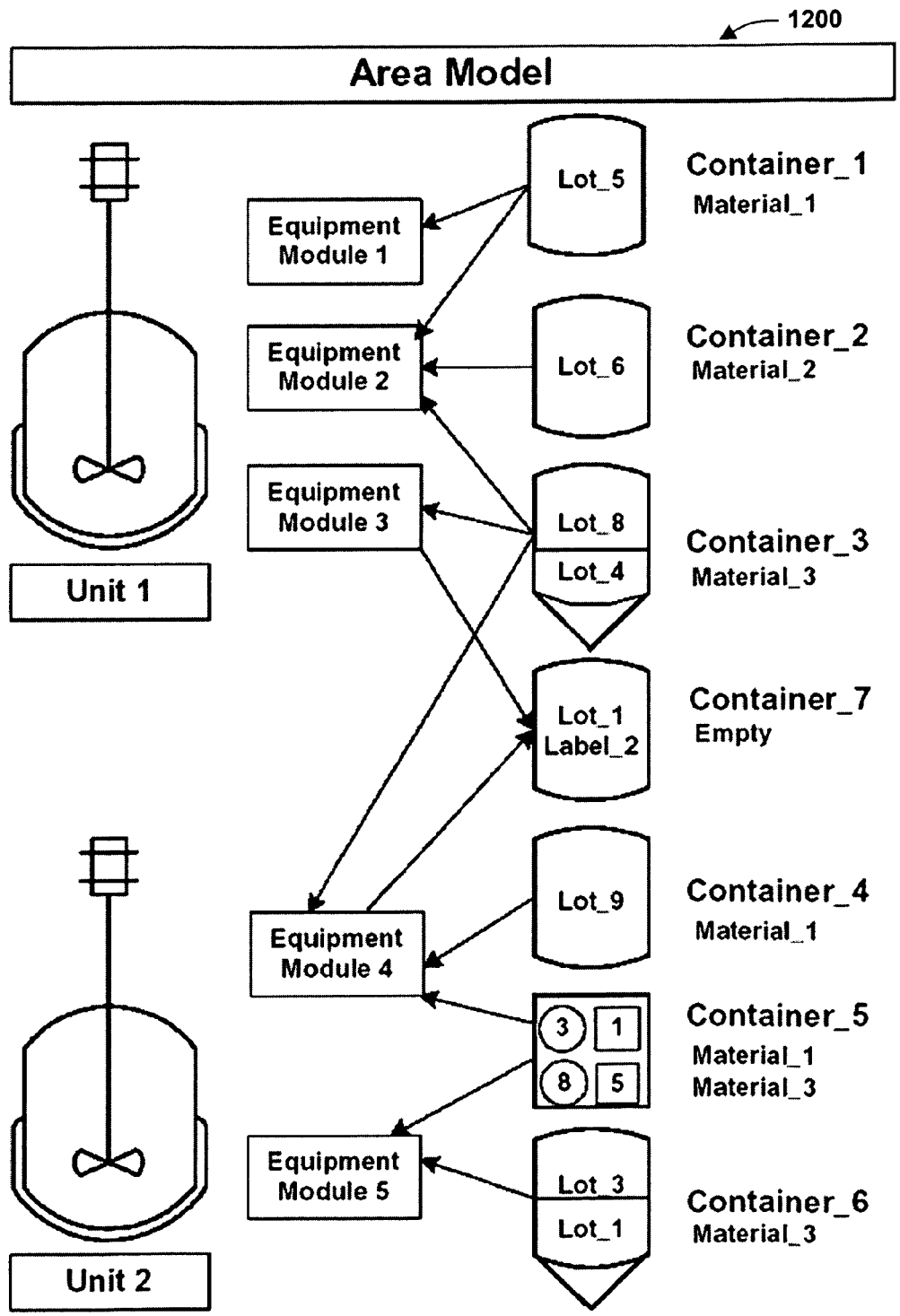

FIG. 12 depicts an area model 1200 having respective units, equipment modules, containers, materials, and having the following illustrative parameters:

Distributions

If a lot and label are specified in the material requirement for a distribution, the values of the lot and label specification are ignored at unit binding but are assigned to the distributed sublot. The purpose of the lot and label parameters on a material distribution are to assign values to the distributed sublot. They are not used when binding containers.

Example

Figure 13:
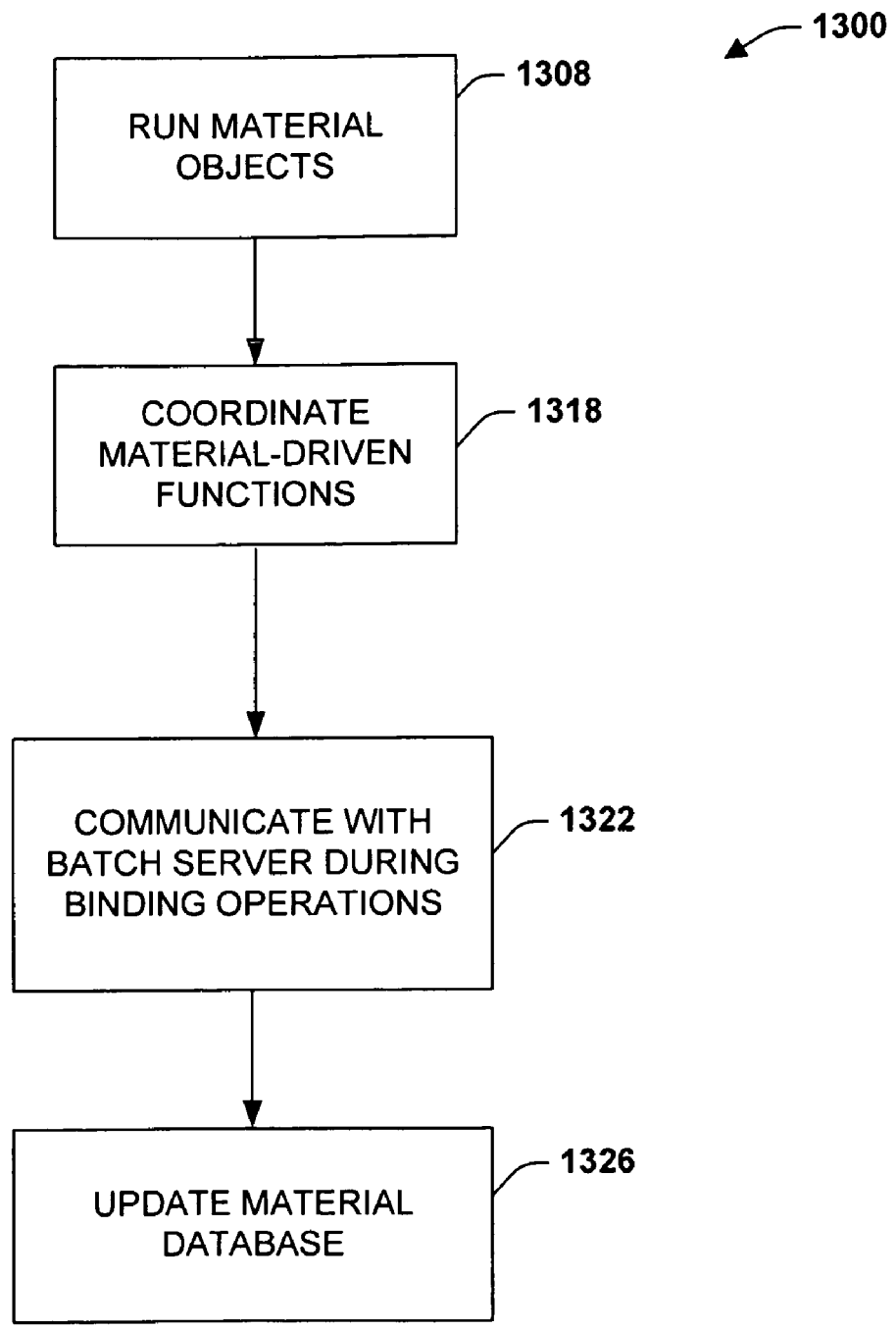
FIG. 13 is a flow diagram illustrating material-driven processing in accordance with an aspect of the present invention.

MBR_ADD:1 requires an addition of Material_1, Lot_5.
MBR_ADD:2 requires an addition of Material_3, Lot_4.
MBR_DUMP:1 requires a distribution of Material_6, Lot_1, Label_2.
In this example, Unit 1 is selected because it can draw the materials with the specified lots. The lot and label for MBR_DUMP:1 are ignored until the material is distributed to Container_7. The lot and label are then assigned to the material FIG. 13 illustrates a material driven methodology in accordance with an aspect the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

FIG. 13 illustrates a material-driven process 1300 in accordance with an aspect of the present invention. Proceeding to 1308, one or more material objects are executed in accordance with batch and material server interactions. For example, a Material Server runs material objects within the context of a COM+ component (can be other object-based models), which is an extension to the Component Object Model (COM). At 1318, material-driven functions are coordinated. For example, these functions can include records actions to a material database that occur during configuration and run-time. Other functions include loading material and container lists from the material database to the Batch Server at startup for population of an area model material and container enumeration sets. Another function includes loading equipment module/container associations from the area model into the material database.

At 1322, communications occur between the material server and the batch server in order to facilitate binding operations. During Unit Binding, the Batch Server communicates with the Material Server to determine if required materials for a recipe can be satisfied by the containers within a unit. During Phase Binding, the Batch Server communicates with the Material Server to retrieve a list of containers and equipment modules based on the material to be added and/or distributed in an associated process. In Prompted Phase Binding, an operator selects a binding solution from a list of container-equipment pairs. In Automatic Phase Binding, phases are selected based on current container priority (container priorities can be assigned manually and/or automatically). In Manual Phase Binding, the Batch Server communicates with the Material Server to obtain a list of containers, lots and equipment modules that support the required material. The list can be presented to the operator for selection of the equipment module to bind to the material step, block or function.

At 1326, updates to a material database are performed before, during, and/or after process operations. This includes performing updates in the material database with actual amounts consumed and/or distributed during a batch run. During an addition or distribution, when a Feed Complete is true, the Batch Server communicates the actual amount to the Material Server. When the Feed Complete is not true, the Batch Server communicates the actual amount to the Material Server, which in turn calculates the difference between a promised amount and the actual amount and sends this calculation back to the Batch Server. The Batch Server utilizes this difference to update a set point for a split feed.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A material reservation system comprising:
   a material server that executes at least one recipe, the recipe includes at least one material driven process, the material driven process utilizes one or more materials;
   a batch server that controls the execution of the material driven processes based at least in part on a material model, an area model, a process model, or any combination thereof, wherein the batch server binds at least one of the material model, the area model, or the process model to the recipe; and
   at least one controller that communicates the material driven processes to one or more automated devices.

2. The system of claim 1, wherein the material server further manages and tracks the utilized material based at least in part on a material type, a material state, a material class, a material consumption level, a material production level, a lot, a sublot, or any combination thereof.

3. The system of claim 2, wherein
   the material state includes at least one of in use, on hold, ready to use, rejected, in service, under review, unacceptable for use, or any combination thereof
   the material type includes at least one of finished, intermediate, raw, or any combination thereof; and
   the material class defines a group of similar materials.

4. The system of claim 1, wherein the material server further stores one or more material definitions, wherein each material definition corresponds to one of the recipes.

5. The system of claim 1, the recipe includes one or more material enabled phases that map one of the materials to one of the automated devices based at least in part on an amount of material to distribute, an amount of materials that are manufactured by the recipe, a set of materials employed by the recipe, a set of the automated devices to be utilized during manufacture of the recipe.

6. The system of claim 1, wherein the material model associates each one of the materials with at least one of a material location, a material aspect, or any combination thereof.

7. The system of claim 1, wherein the area model that maps the materials of the material model to one or more potential automated devices that are configured to manufacture the recipe.

8. The system of claim 1, wherein the process model includes at least one of a program, an executable object that controls the automated devices, a function chart, a function block, ladder logic, or any combination thereof.

9. The system of claim 1, wherein the process model is based at least in part on a real time execution of the recipe.

10. The system of claim 1, wherein the material model is updated based at least in part on a changed state, a depleted material, a quality control level, or any combination thereof.

11. A method for reserving materials, comprising:
    managing an inventory of a material by controlling relationships between a set of equipment that is unused and a recipe that includes a set of materials;
    selecting equipment that is utilized to manufacture the recipe;
    executing the recipe based at least in part on a material model, an area model, a process model, or any combination thereof; and
    updating at least one of the models based at least in part on a changed state, a depleted material, a quality control level, or any combination thereof.

12. The method of claim 10, wherein the material model associates each one of the materials with at least one of a material location, a material aspect, or any combination thereof.

13. The method of claim 10, wherein the area model that maps the materials of the material model to one or more potential automated devices that are configured to manufacture the recipe.

14. The method of claim 10, wherein the process model includes at least one of a program, an executable object that controls the automated devices, a function chart, a function block, ladder logic, or any combination thereof.

15. The method of claim 10, further comprising managing the recipe based at least in part on a material type, a material state, a material class, a material consumption level, a material production level, a lot, a sublot, or any combination thereof.

16. The method of claim 10, further comprising directing the recipe to select one or more alternative sources to supply the material utilized in the recipe.

17. The method of claim 11, wherein the updating is in accordance with an Enterprise Resources Planning (ERP) database.

18. A material reservation system comprising:
    means for managing an inventory of a material by controlling relationships between a set of equipment that is unused and a recipe that includes a set of materials;
    means for selecting equipment that is utilized to manufacture the recipe;
    means for executing the recipe based at least in part on a material model, an area model, a process model, or any combination thereof and
    means for updating at least one of the models based at least in part on a changed state, a depleted material, a quality control level, or any combination thereof.

* * * * *